May 31, 1966

F. KOHLER 3,254,153

PROTECTIVE SPLICE COVER FOR CABLE SPLICES

Filed Oct. 7, 1964

INVENTOR.
FRED KOHLER

BY Richard J. Ludberg

ATTORNEY

United States Patent Office 3,254,153
Patented May 31, 1966

3,254,153
PROTECTIVE SPLICE COVER FOR CABLE SPLICES
Fred Kohler, Chicago, Ill., assignor to Kohler & Besser Electronics, Inc., a corporation of Illinois
Filed Oct. 7, 1964, Ser. No. 402,150
2 Claims. (Cl. 174—93)

This invention relates to a protective sleeve or cover for a splice connecting a number of cables and cable strands, and has particular reference to those applications where a feeder cable is maintained under pressure of an inert gas to keep moisture away from the cable strands therein.

The improved protective cover comprising the present invention has been designed primarily for use in connection with the gang splicing of telephone cables, for example the multiple feeder cables entering a building and each of which accommodates many trunk lines, or the vault circuit cables existing at the telephone exchange itself or at outlying relay stations. The structure according to the invention employs the pressure of the inert gas within the sheath of the cable entering the protective splice cover for exerting a pressure on the sheath of the smaller outgoing cables to effect a seal between the protective splice cover and each of the outgoing cables.

It is essential that such cable splice covers be impervious to the entrance of dirt and moisture and, as a consequence it is necessary to seal the various feeder and main frame cables at their regions of entrance and emergence respectively. Since the sheathed cables are often subject to internal pressure from an inert gas to prevent the ingress of moisture to the cable strands, the pressure from said inert gas is employed to effect a seal between an end closure of the splice cover and the one or more main frame cables emerging from the end closure.

The structure according to the present invention is designed to accomplish complete sealing of the cable splice against entrant moisture, and to maintain the proper pressure throughout the run of cable, and toward this end it contemplates the provision of a novel three-piece sectional cover assembly including an open-ended tubular cylindrical jacket body, together with end caps or closure therefor, the three parts being formed of a resilient flexible moldable material such as a suitable elastomer having a proper durometer. The end cap or closure accommodating entrance of the encased feeder cable at one end is provided with a single central opening therethrough, while the other end cap or closure accommodating a plurality of outgoing main frame cables is formed with plural openings, there being one opening for each such individual main frame cable. Preferably, these latter openings are arranged in a plurality of concentric circular rows, each being provided with an inwardly extending thin walled flexible sealing flange adapted to encircle the outgoing cable and to have the pressure within the cover assembly constrain the flange about its outgoing associated main frame cable. The flanges which surround the openings in the end cap for the main frame cables are made with a slightly smaller I.D. than the O.D. of the main frame cable sheath, so that the flange is stretched slightly somewhat around the main frame cable, such stretching constraining the cable in addition to the constraining effect of the inert gas.

The end cap or closure for the main frame cables has an end web in which the aforesaid flanges are formed, such flanges not having the root or base thereof at the inner face of the web, but having such root or base originating at a plane spaced from such inner face of the web. The flange has a frusto-conical shape, so that the outer surface thereof is spaced from the web, thereby giving a large gripping surface of the flange with the main frame cable, without requiring that the flange extend for a long distance into the protective splice cover. A certain amount of clearance is afforded between the outer surface of the flange and the web proper, such clearance defining an annular space in which the pressure within the splice cover imposes a radial force against the flange and the main frame cable gripped therein, so as firmly to engage the main frame cable and prevent the entrance of moisture to the splice cover and to the cables therein. By such a construction an individual clamping band for each main frame cable is made unnecessary.

The provision of a composite three-piece protective cover of the character briefly outlined above being among the principal objects of the invention, it is another object to provide such a protective cover wherein the component parts thereof are susceptible of conventional molding operations and require no complicated or intricate molding dies, thus contributing toward economy of manufacture.

A still further object is to provide an end cap or closure having openings for a plurality of main frame cables, such openings being originally closed and sealed by the provision of integral sealing webs which are capable of removal by a punching operation so that only the required number of openings need be prepared for use, the unused openings remaining sealed. Thus, if at a future time additional main frame cables are to be connected into the circuitry, new main frame cables may be brought into the splicing area through the unused openings by the simple expedient of punching out of the sealing webs.

Other objects and advantages of the invention will become readily apparent as the following description ensues.

In the accompanying single sheet of drawings forming a part of this specification, one illustrative embodiment of the invention is shown.

Figure 1:
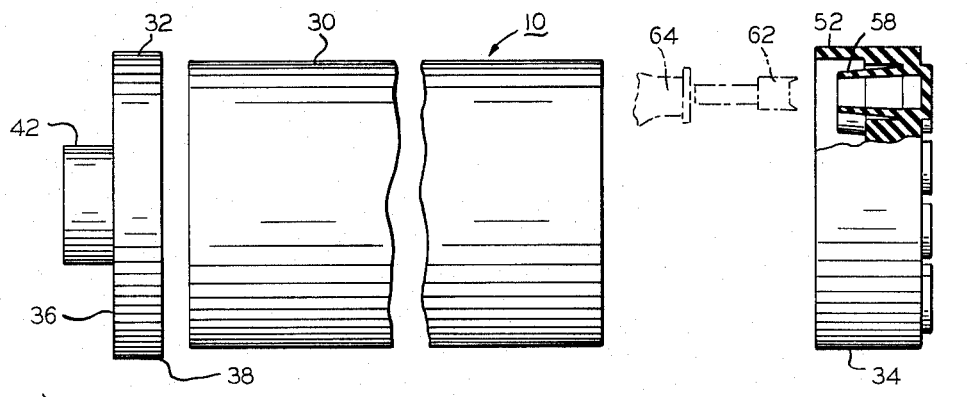
FIG. 1 is a fragmentary exploded view of a protective cable splice cover constructed according to the present invention.
Figure 2:
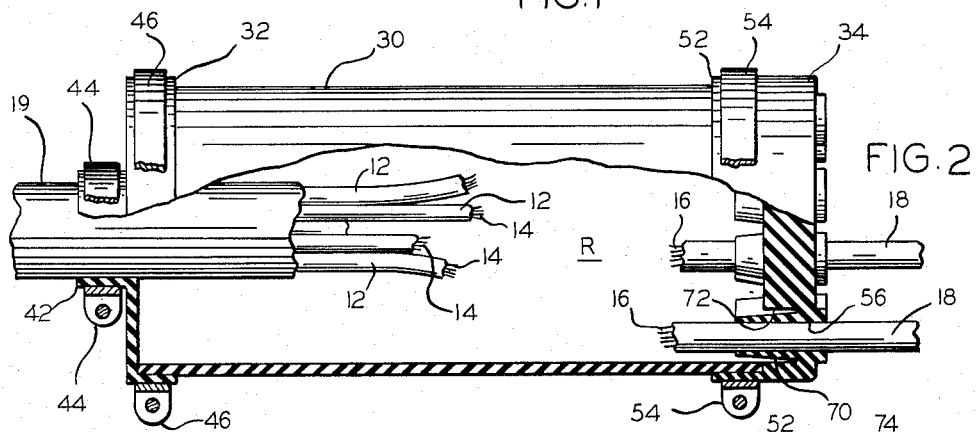
FIG. 2 is an elevation view of the assembled cable splice cover of FIG. 1, parts being shown broken away and in longitudinal section, showing the same operatively associated with a splice made between a sheathed feeder cable comprised of a plurality of cable strand bundles and a plurality of main frame cables.
Figure 4:
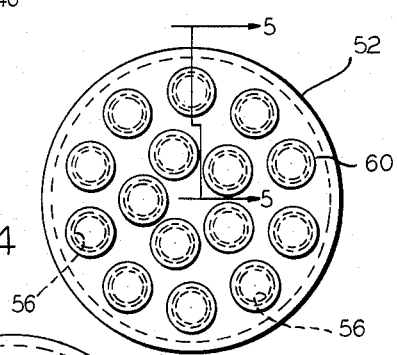
FIG. 4 is an opposite end view of the cable splice cover showing the end cap for the main frame cables.
Figure 3:
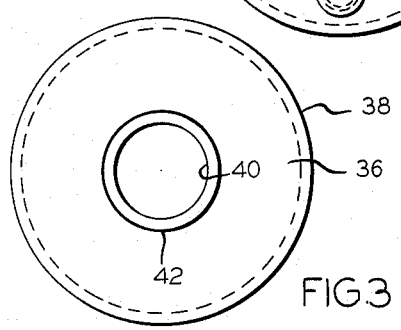
FIG. 3 is an end view of an entrance end cap for the feeder cable.

Referring now in particular to FIGS. 1 and 2, the protective cable splice cover embodying the principles of the present invention has been designated in its entirety at 10 and it is employed for the purpose of enclosing the splicing area or region R associated with a series of incoming feeder cables 12 containing multiple leads or circuit wire strands 14 adapted to be spliced to respective leads or circuit wire strands 16 associated with a series of outgoing sheathed cables 18 referred to as main frame cables. If the cable splice cover 10 is employed in connection with telephone circuitry, the incoming feeder cables 12 may be part of a single feeder cable 19 coming into a building, in which case the cables 18 will represent main frame cables, while the leads 14 and 16 of such cables 18 and 19 will represent the various trunk lines extending to the subscribers telephones.

In the illustrated environment of the present cable splice cover 10, it may be assumed that a full complement of fifteen incoming cable bundles 12 extend into the cover 10 while only two outgoing main frame cables 18 emerge therefrom. The details of the splicing between the strands or leads 14 and 16 have not been illustrated, since such details will vary widely with different installations and splicing techniques.

The splicing region R is of appreciable extent so that ample room is afforded for the staggering of the individual splices.

As best seen in FIGS. 1 to 4, the splice cover 10 of the present invention involves in its general organization three principal parts, namely a medial cylindrical jacket 30 and a pair of end caps 32 and 34 respectively. The end cap 32 accommodates the entry of the feeder cable 19 and its groups of cable strands 12 and thus, for convenience of description herein it will hereinafter be referred to as the lead-in end cap. The opposite end cap 34 accommodates exit of the individual main frame cables 18 and will hereinafter be referred to as the lead-out end cap. The three parts 30, 32 and 34 are preferably formed of a molded elastomer which possesses some degree of resistance to compressional forces, so that the parts may be deformed to accommodate a sheathed cable 18, the cross-section of which may not be a perfect circle, but may be distorted to an elliptical or other out-of-round cross section, for example, but will retain their shape under all normal conditions encountered in use. Various elastomeric materials are suitable for the manufacture of the parts including rubber, either natural or synthetic, a rubber compound such as vinyl or silicone rubber, or a rubber substitute.

The end cap 32 is in the form of a flanged annulus, and it includes a web 36 having a rim flange 38 telescopically received over the entrance end of the cylindrical jacket 30 with a tight frictional fit. Web 36 has a relatively large entrant opening 40 and is coextensive with a cable retaining flange 42. Flange 42 is adapted to be constricted about the sheath of cable 9 which encloses the grouped cables 12 by a suitable split clamping band assembly 44 provided for this purpose. A similar split clamping band 46 may be employed to constrict the rim flange 38 about the cylindrical jacket 30.

Figure 5:
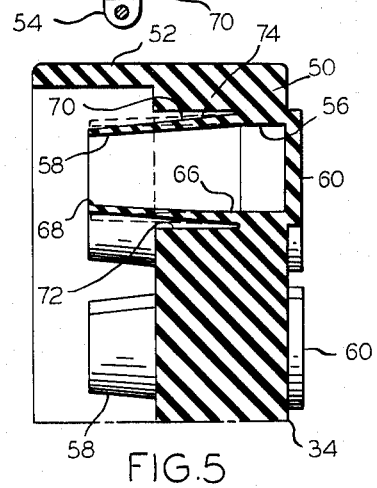
FIG. 5 is an enlarged fragmentary transverse sectional view of the end cap for the main frame cables, said view being taken along the line 5—5 of FIG. 4 and looking in the direction of the arrows.

The end cap 34 is also in the form of a flanged annulus and has a web 50 provided with a rim flange 52 telescopically received over the exit end of the jacket 30 with a tight frictional fit. Flange 52 is constricted about the jacket by means of a split clamping band 54. As best seen in FIG. 5, the web 50 is formed with a plurality of exit openings 56 therethrough, each opening 56 being defined by an inwardly extending main frame cable-retaining flange 58. Normally, the outer end of each retaining flange 58 is closed by the provision of an integral disk-like punch-out membrane or web 60 which extends thereacross but which is capable of being removed by means of a manually operable punch 62 adapted to be struck by a hammer 64, these being shown in dotted lines in FIG. 1. When it is desired to remove one of the webs 60 it is merely necessary for the operator to insert the punch 62 into the flange 58, and apply the circular cutting end of the punch 62 to the inner face of the web 60 while the outer surface of web 60 impinges a suitable hard stationary abutment, not shown, after which a blow by the hammer 64 shown will effectively sever the membrane 60 from the web 50.

Each of the inward extending flanges 58 is substantially frusto-conical in configuration with the large diameter 66 tapering to a small diameter 68 at the inner end thereof. The portion of flange 58 of large diameter is located integrally with web 50 at a plane substantially midway of the thickness of web 50. The outer surface of flange 58 is likewise frusto-conical in shape and a portion 70 of the outer surface thereof is spaced a slight amount from a cylindrical wall 72 in web 50 to define an annular cavity 74 in web 50 surrounding flange 58.

When the cable 18 is introduced through flange 58, the walls of flange 58 are stretched around the cable 18 to perfect a seal between cable 18 and flange 58. When the parts are assembled as seen in FIG. 2, and the region R is pressurized by the pressure within the sheath of incoming cable 19, the pressure is manifested against the entire exterior surface of flange 58 to constrain the same additionally against the cable 18.

By reason of the combination of the elastic constraint and the pressure constraint against cable 18 a very tight seal is made, thereby preventing the entrance of moisture to the cable splice cover 10. The walls of flange 58 are thin and resilient enough to encompass a cable 18 which may not be entirely round in cross-section, and irrespective of the cross sectional shape of cable 18, the flange 58 can tightly grip same.

The various openings 56 are arranged in any convenient pattern such as the concentric inner and outer circular rows of openings shown. Preferably, the number of opening 56 will correspond to the number of grouped cables 12 entering the splice cover 10, so that when all of such cables are put to use, a corresponding number of outgoing main frame cables 18 may be brought into the splice cover 10 through the openings 56 and the leads 16 thereof spliced to the leads 14 of the cables 12.

The specific forms of split clamping bands 44, 46 and 54 shown herein form no part of the present invention. Various clamping bands suitable for the purpose of constricting the rim flanges 32 and 52 about the rim regions of the jacket 30 and about the cables 18 are commercially available.

In the installation of the protective splice cover 10, the encased incoming cables 12 as a group will be inserted through the opening 40 in the end cap 32, and the cable group pulled through the end cap 34 a sufficient distance that the cylindrical jacket 30 may be inserted endwise over these cables and passed therealong until the loose wires 14 are accessible beyond the far end of the jacket 30 for splicing purposes. The requisite number of outgoing main frame cables 18 will be inserted through the openings 56 which previously are prepared for their reception by punching out the membranes 60. Thereafter, the necessary splicing operations are effected and, after all wires are taped or otherwise prepared for storage of the spliced joints within the cover 10, the end cap 32 may be assembled upon the jacket 30 and the assembly of the end cap 32 and jacket 30 slid along the group of incoming cables 12 until the spliced joints are all contained within the cylindrical confines of the jacket. The clamping bands 44, 46 and 54 may then be applied and tightened. When pressure is applied to region R through incoming cable 19 a tight seal is made between each main frame cable 18 and end cap 34, no taping or clamping of the cables 18 being required to effect such seal.

The invention is not to be limited to the exact arrangement of parts shown in the accompanying drawings or described in this specification as various changes in the details of construction may be resorted to without departing from the spirit of the invention. For example, whereas the end cap 34 has been illustrated and described herein as being formed with fifteen exit openings 56, including two concentric circular rows of openings, a greater or lesser number of such openings may be employed as desired. Furthermore, it is not essential that both end caps 32 and 34 be removable for purposes of access to the interior of the protective jacket 30. Under certain circumstances it may be desirable that the end cap 32 be dispensed with and the entrance end of the jacket 30 closed by an integral end wall.

Having thus described this invention in such full, clear, concise and exact terms as to enable any person skilled in the art to which it pertains to make and use the same, and having set forth the best mode contemplated of carrying out this invention, the subject matter regarded as being patentable is particularly pointed out and distinctly claimed in what is claimed, it being understood that equivalents or modifications of, or substitutions for, parts of the above specifically described embodiment may be made without departing from the scope of the invention as set forth in what is claimed.

I claim:

1. In a protective splice cover adapted to enclose a splicing region wherein the lead wires of an incoming cable are joined to the lead wires of outgoing cables, said cover comprising in combination: a tubular jacket having an entrance end through which the incoming cable is adapted to extend and an exit end through which the outgoing cables are adapted to extend, means defining a closure for said entrance end of the jacket and through which the incoming cable is adapted to sealingly extend, and a removable end cap normally closing the exit end of said jacket, said end cap comprising a one-piece integral body of resilient material of generally cup-shape and including a web provided with a continuous peripheral flange telescopically fitting over the rim region of said exit end of the jacket, with said web effectively closing said exit end, said web being formed with a series of circular openings therein designed for individual reception therethrough of said outgoing cables, each of said openings being continuous with a surrounding inwardly extending resilient flange adapted to be constricted about a respective outgoing cable, each of said inwardly extending resilient flanges being substantially frusto-conical in shape and constrained by stretching thereof about an outgoing cable, and having a substantial cylindrical area of contact with said cable when the same is stretched thereover, each of said inwardly extending flanges extending from near a median point of the thickness of said end cap to provide an annular cavity in said end cap around the base portions of said flange and resultant constraining force thereby.

2. The invention according to claim 1 wherein pressure in said tubular jacket is transmitted to said annular cavity, and wherein the so afforded additional length of said frusto-conical extension provides additional area for impingement of a constraining force against said outgoing cable.

References Cited by the Examiner

UNITED STATES PATENTS 2,862,042  11/1958  Bollmeier _____ 174—76 XR

FOREIGN PATENTS 110,499  8/1928  Austria.
1,053,609  3/1959  Germany.
102,214  7/1963  Norway.

OTHER REFERENCES

"Cable Grommet," published in IBM Technical Disclosure Bulletin, vol. 1, No. 5, 2/1959, page 35, Lyon.

BERNARD A. GILHEANY, *Primary Examiner.*

DARRELL L. CLAY, *Examiner.*